Dec. 26, 1950  J. ARTER  2,535,028

SPEED VARIATOR

Filed Feb. 18, 1948  5 Sheets-Sheet 1

Dec. 26, 1950        J. ARTER        2,535,028

SPEED VARIATOR

Filed Feb. 18, 1948        5 Sheets-Sheet 2

Dec. 26, 1950            J. ARTER            2,535,028

SPEED VARIATOR

Filed Feb. 18, 1948            5 Sheets-Sheet 3

Dec. 26, 1950   J. ARTER   2,535,028
SPEED VARIATOR
Filed Feb. 18, 1948   5 Sheets-Sheet 4

Fig.13

INVENTOR.
Jakob Arter
BY David Ruies
Attorney

Fig. 14

Patented Dec. 26, 1950

2,535,028

UNITED STATES PATENT OFFICE 2,535,028

SPEED VARIATOR

Jakob Arter, Oberengstringen, Switzerland, assignor, by mesne assignments, to Olkon Research Corporation, New York, N. Y., a corporation of Delaware Application February 18, 1948, Serial No. 9,245
In Switzerland January 2, 1941

Section 1, Public Law 690, August 8, 1946
Patent expires January 2, 1961

30 Claims. (Cl. 74—796)

The present invention relates to translating apparatus, and more particularly to apparatus for increasing and decreasing speed. From a more specific aspect, the invention relates to apparatus for transmitting power from a driving shaft to a driven shaft.

An object of the invention is to provide a new and improved translating apparatus of the above-described character.

Another object is to provide a new and improved speed-reducer.

A further object is to provide a new and improved speed-increasing mechanism.

In Letters Patent of the United States 1,718,846, issued June 25, 1929, there is disclosed a variable-speed friction device for transmitting motion from a driving shaft to a driven shaft alined therewith, comprising a plurality of power-transmitting balls disposed symmetrically with respect to the common axis of the shafts, two members respectively provided with surfaces of revolution about the said common axis to form ball races for engaging the balls in order to rotate them about inclined axes, thereby to effect relative rotary movement between the ball races, one of the members being rotatable with one of the shafts, means whereby rotary movement of either shaft is transmitted through the ball races and the balls to the other shaft, and a plurality of rolls disposed symmetrically with respect to the said common axis, each roll being disposed between and rotatably engaging two adjacently disposed balls. The rolls are simultaneously adjustable to adjust the angles of inclination of the balls, thereby to vary the transmission of the rotary movement between the ball races. The apparatus of the said Letters Patent, however, is subject to the disadvantages of complexity and unavoidable lost motion.

Still another object of the invention, therefore, is to improve upon the construction of the above-named Letters Patent, with the ends in view of simplifying the construction and reducing the lost motion.

Other and further objects will be explained hereinafter and will be particularly pointed out in the appended claims.

The invention will now be more fully explained in connection with the accompanying drawings, in which.

Figure 1:
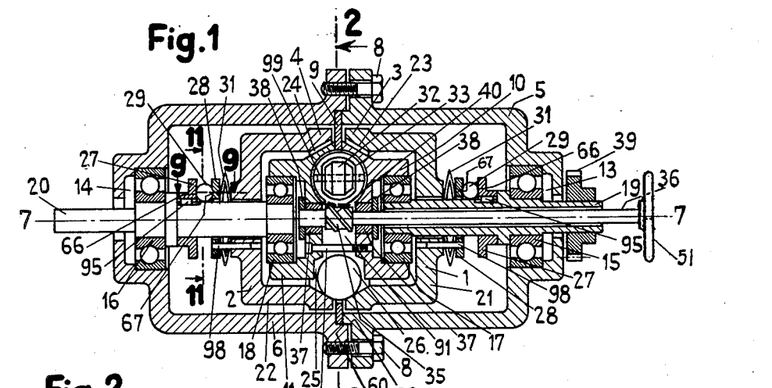
Fig. 1 is a longitudinal section of a translating apparatus constructed in accordance with the present invention, taken upon the line 1—1 of Fig. 2, looking in the direction of the arrows.
Figure 2:
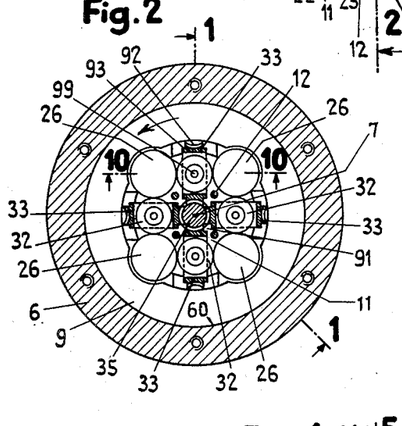
Fig. 2 is a vertical section taken upon the line 2—2 of Fig. 1, looking in the direction of the arrows.
Figure 3:
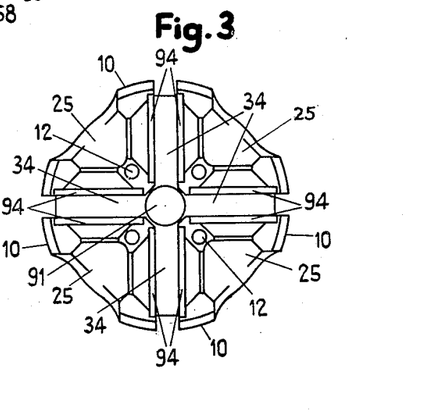
Fig. 3 is an elevation of one of the cage members.

Referring first to Figs. 1 to 3, a power-transmitting driving shaft 20 extends through the end wall 2 of a cup-shaped half-shell 22. A driven shaft 19 alined with the driving shaft 20 extends through the end wall 1 of a cup-shaped half-shell 21. The power may be transmitted from the driven shaft 19 to any desired load through a gear 39. The half-shells 21 and 22 are shown mounted with their respective open peripheral ends 3 and 4 disposed adjacent to each other to form a housing for the speed-transmitting mechanism more fully described hereinafter. The half-shells 21 and 22 are rotatable with respect to and slidable upon the respective shafts 19 and 20, but they are rotatable with these respective shafts 19 and 20 through a mechanism described hereinafter.

The peripheral end 4 is therefore rotatable with the driving shaft 20 and the peripheral end 3 with the driven shaft 19. The inner ends of the alined shafts 20 and 19 are disposed within the housing constituted of the cup-shaped half-shells 21 and 22. It will be obvious that either shaft may be the driving shaft and the other the driven shaft.

The driving shaft 20 is journaled in bearings 16 and 18 on opposite sides of the end wall 2 of the cup-shaped half-shell 22. The driven shaft 19 is journaled on bearings 15 and 17 on opposite sides of the end wall 1 of the cup-shaped half-shell 21. The bearing 16 is mounted in an extension 14 of reduced diameter of a cup-shaped member 6. The bearing 15 is mounted in an extension 13 of reduced diameter of a cup-shaped member 5. The outer end of the driving shaft 20 projects outwardly through the extension 14. The outer end of the driven shaft 19 similarly projects outwardly through the extension 13. The open periphery 58 of the cup-shaped member 5 is fitted accurately in the open periphery 60 of the cup-shaped member 6, and the cup-shaped members 5 and 6 are then secured together in any desired manner, as by means of bolts 8, so as to provide a closed cylindrical container for the speed-controlling mechanism. The accurate fit provides for proper accurate alinement of the parts in the container 5, 6.

According to the illustrated embodiment of the invention, the shafts 19 and 20 are fixed to respective collars 27 in any desired manner, as by means of a key 95 or a press fit. The collars 27 are provided with ball seats 66 in which are seated torque-transmitting pressure balls 29 that are also seated in ball seats 67 of collars 28 that are fixed to the end walls 1 and 2 of the respective half-shells 21 and 22 by pins 98. The pins 98 may be press-fitted in the collars 28 and they may be slidably mounted in holes provided in the respective end walls 1 and 2. The collars 27 and 28 and the pressure balls 29 are disposed in the cylindrical container 5, 6 between the end wall 2 and the extension 14 and between the end wall 1 and the extension 13.

The adjacently disposed peripheral open ends 3 and 4 of the cup-shaped half-shells 21 and 22 are respectively provided with surfaces of revolution 23 and 24 about the common axis 7 of the alined shafts 19 and 20. The surfaces of revolution 23 and 24 are shown conical, with the vertices of the cones disposed on the axis 7 to the right and the left, respectively, of the peripheral open ends 3 and 4 of the respective half-shells 21 and 22. The surfaces of revolution 23 and 24 are therefore inclined toward each other away from the axis 7, to form races for engaging a plurality of power-transmitting balls 26.

The cup-shaped half-shells 21 and 22 are yieldingly forced toward each other by springs 31 to maintain the power-transmitting balls 26 and the ball races 23 and 24 in engagement. The springs 31 are disposed between the collars 28 and the respective end walls 1 and 2 of the half-shells 21 and 22.

Figure 9:
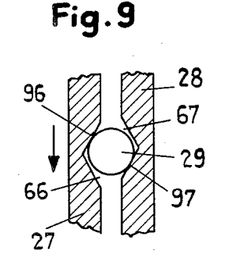
Fig. 9 is a section taken upon the line 9—9 of Fig. 1 upon a larger scale, looking in the direction of the arrows.

Power may therefore be transmitted from the driving shaft 20 to the cup-shaped member 22, and from the cup-shaped member 21 to the driven shaft 19, by respective pressure units, each comprising collars 27 and 28, the pressure balls 29 and a spring 31. Though each pressure unit is shown provided with a single spring 31, more than one spring 31 may be provided for each pressure unit, if desired. Assuming that the driving shaft 20 is rotated in the direction of the arrow of Fig. 2, to transmit torque, this rotation will be transmitted through the collar 27 fixed thereto to the pressure balls 29. The far walls 96 of the ball seats 66 of the collars 27 will then engage the pressure balls 29, causing the balls 29 to leave the ball seats 66 slightly, as illustrated in Fig. 9, to engage the near walls 97 of the ball seats 67 of the collars 28. This will cause the collars 27 and 28 to become further separated slightly along the axis 7 and to become displaced somewhat angularly. In this manner, the torque of the driving shaft 20 will become transmitted through the collars 27 and 28 and the pressure balls 29, and through the pins 98, to the cup-shaped half-shell 22. A similar but reverse operation will occur during the transmission of torque from the cup-shaped half-shell 21 to the driven shaft 19. Pressure will be produced between the ball races 23 and 24 and the power-transmitting balls 26 as a result of the engagement of the pressure balls 29 and the action of the springs 31. This pressure automatically increases and decreases with the transmitted torque. The underlying theory will be described more fully hereinafter.

The power-transmitting balls 26 are located in spaces 25 disposed symmetrically along the periphery of a cage located in the housing constituted of the cup-shaped half-shells 21 and 22. For purposes of assembly, the cage may be formed in two parts 10 and 11, held together by screws 12. It is carried by a positioning ring 9 that is clamped in place in the open peripheries 58 and 60, between the cup-shaped members 5 and 6, symmetrically with respect to the common axis 7 of the shafts 19 and 20. The bearing 17 is fixed in the cage part 10 and the bearing 18 in the cage part 11.

During the rotation of the driving shaft 20, therefore, the ball race 24 of the cup-shaped half-shell 22 rotatable therewith frictionally engages the power-transmitting balls 26 in order to effect their rotation about usually inclined axes, and the rotation of the balls 26, in turn, is communicated frictionally to the ball race 23 of the cup-shaped half-shell 21 and the driven shaft 19 rotatable therewith. The cup-shaped half-shells 21 and 22 may therefore be termed friction members. The rotary movement of the driving shaft 20 becomes transmitted to the driven shaft 19 as a result of the rotary movement thus frictionally transmitted between the ball races 23 and 24 and the cup-shaped half-shells 21 and 22, through the power-transmitting balls 26.

The speed of transmission of the rotary movement between the ball races 23 and 24 is dependent upon the angle of inclination with respect to the common axis 7 of the alined shafts 20 and 19 of the axes about which the power-transmitting balls 26 individually rotate during the transmission of the friction drive between the ball races 23 and 24. This angle of inclination, in turn, is under the control of a plurality of rolls 32, one between and engaging each two adjacently disposed power-transmitting balls 26. Each ball 26, therefore, is engaged at four contact points, two of them provided by the ball-race surfaces 23 and 24, and the other two by two adjacently disposed rolls 32. This will presently be described more fully in connection with Fig. 14.

Figure 10:
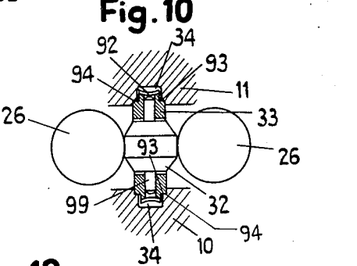
Fig. 10 is a similarly enlarged section taken upon the line 10—10 of Fig. 2, looking in the direction of the arrows.
Figure 11:
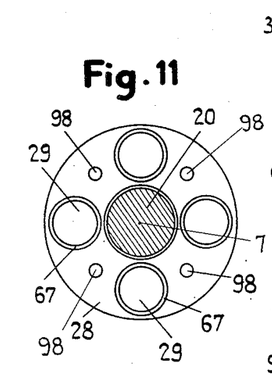
Fig. 11 is a similarly enlarged section taken upon the line 11—11 of Fig. 1, looking in the direction of the arrows.

Each roll 32 is rotatable about a shaft 99 mounted in the opening of a supporting ring carrier 33 externally provided with an annular gear 92. The supporting carriers 33 are mounted in the cage 10, 11, symmetrically with respect to the common axis 7 of the alined shafts 19 and 20 about a region of space 91 in the cage, in the neighborhood of the axis 7. Each supporting carrier 33 is provided with a pair of annular shoulders 93, shown more particularly in Fig. 10, rotatably engaging two bearing surfaces 94 provided upon each cage member 10 and 11. Each two bearing surfaces 94 are separated by a space 34 in which one of the carriers 33 is mounted so as to rotate in a plane through the axis 7. As the cage 10, 11 is shown provided with four spaces 25, four power-transmitting balls 26 are diagrammatically shown in Figure 14 at 262, 264, 266 and 268. The rolls 32 for engaging these power-transmitting balls 26 must therefore naturally also be four in number. Three of these are shown diagrammatically in Fig. 14 as discs at 321, 323 and 325, with their shafts 99 disposed at the respective centers $D_1$, $D_3$ and $D_5$. For purposes of clarity, in order to avoid confusion in the drawings, the fourth roll, with its shaft 99, is omitted from Fig. 14, but its center $D_7$ is shown in this Fig. 14.

Figure 14:
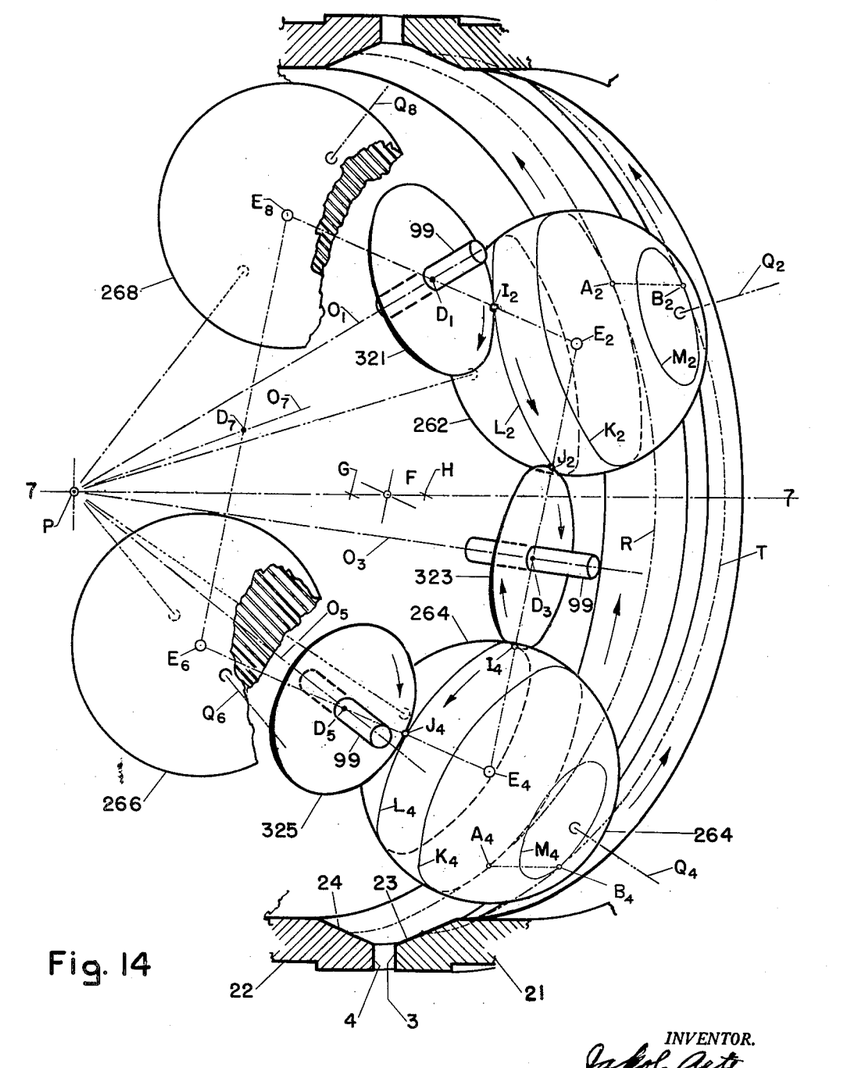
Fig. 14 is a diagrammatic fragmentary perspective, partly broken away, of the four power-driven balls, three of the rolls contacting therewith, and adjacently disposed parts, in a setting explanatory of the theory underlying the operation.

The power-transmitting ball 262 is shown in Fig. 14 engaged by the rolls diagrammatically indicated by the discs 321 and 323 at the points of contact $I_2$ and $J_2$, respectively, and the power-transmitting ball 264 by the rolls 323 and 325 at the points of contact $I_4$ and $J_4$, respectively. The points of contact $J_2$ and $I_4$ of the roll 323 with the two adjacently disposed power-transmitting balls 262 and 264 are therefore disposed at opposite ends of a diameter of the roll 323. The center $D_3$ of the roll 323, through which its shaft 99 extends, of course, is alined, not only with these points of contact $J_2$ and $I_4$, but also with the respective centers $E_2$ and $E_4$ of these power-transmitting balls 262 and 264. The axis of the shaft 99 of the roll 323 is shown at $O_3$, and the roll 323 rotates about this axis $O_3$ in the direction indicated by the arrows shown in Fig. 14.

The center $D_1$ of the roll 321, through which the shaft 99 of this roll 321 extends, is similarly alined with its points of contact with the two adjacently disposed power-transmitting balls 268 and 262 and the centers $E_8$ and $E_2$ of these power-transmitting balls. The point of contact $I_2$ of the roll 321 with the ball 262 is alone shown in Fig. 14, its point of contact with the ball 268 being omitted, for clearness. The roll 321 rotates about the axis $O_1$ of its shaft 99 in the direction indicated by the arrow of Fig. 14.

The center $D_5$ of the shaft 99 of the roll 325 is similarly alined with its points of contact with the two adjacently disposed power-transmitting balls 264 and 266 and their respective centers $E_4$ and $E_6$. Only the point of contact $J_4$ of the roll 325 with the ball 264 is illustrated in Fig. 14, its point of contact with the ball 266 being similarly omitted, for clearness. The roll 325 rotates about the axis $O_5$ of its shaft 99 in the direction of the arrow shown in Fig. 14.

Though the roll that engages the two adjacently disposed power-transmitting balls 266 and 268 is omitted from Fig. 14, the center $D_7$ of its shaft 99 is also similarly alined with its points of contact, not shown, with the power-transmitting balls 266 and 268 and their centers $E_6$ and $E_8$. This additional roll rotates about an axis $O_7$.

Figure 13:
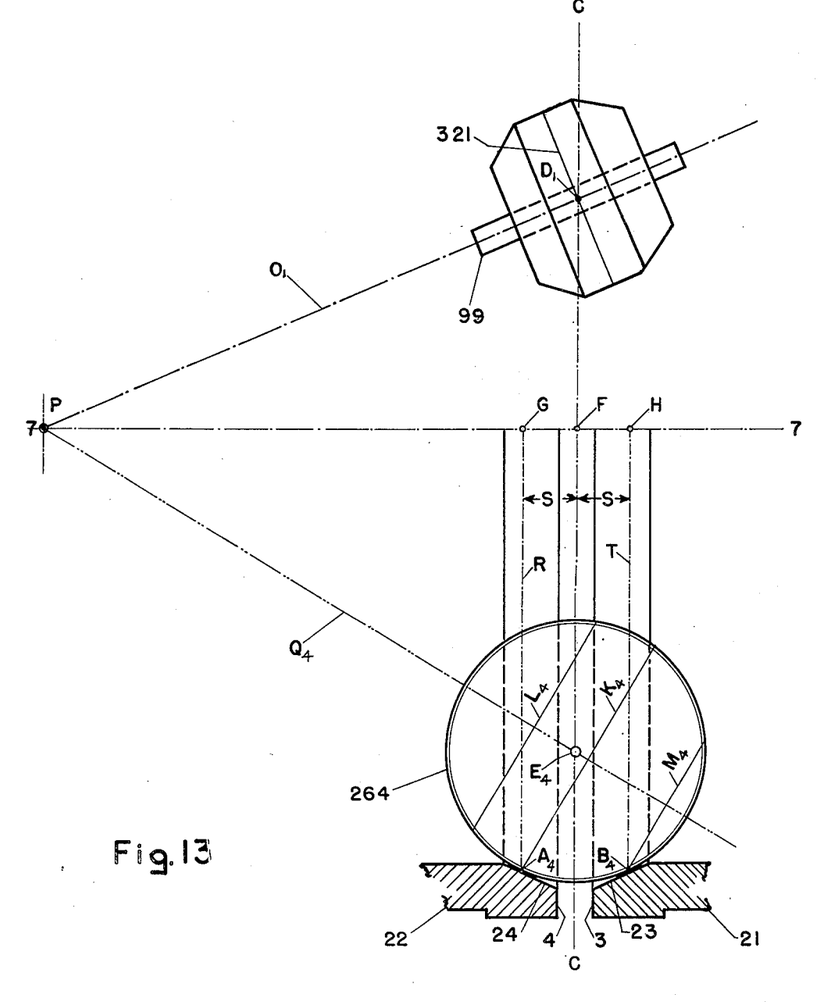
Fig. 13 is a diagrammatic view, upon a larger scale, of the power-transmitting ball and the roll shown in Fig. 1, but with the roll shown adjusted to a different inclination than that shown in Fig. 1, and with the ball shown in engagement with the ball races of the cup-shaped half-shells, illustrated in fragmentary section.

The four centers $D_1$, $D_3$, $D_5$ and $D_7$ of these rolls are thus disposed at the fixed central points of the four sides of a square the corners of which are determined by the fixed centers $E_2$, $E_4$, $E_6$ and $E_8$ of the power-transmitting balls 262, 264, 266 and 268, respectively. This square is positioned in a plane, illustrated at C in Fig. 13, that is disposed symmetrically with respect to the cup-shaped half-shells 21 and 22 and the cup-shaped members 5 and 6. The common axis 7 of the alined shafts 19 and 20 is shown in Figs. 13 and 14 intersecting the plane C at the center F of the square.

The side of this square connecting the fixed centers $E_2$ and $E_4$ of the two adjacently disposed power-transmitting balls 262 and 264 is alined with the diameter of the roll 323 through its center $D_3$ and the points of contact $J_2$ and $I_4$ of this roll 323 with these power-transmitting balls 262 and 264. The shaft 99 of this roll 323, therefore, since it is perpendicular to the plane of this roll, is perpendicular also to this side of the square connecting the centers $E_2$ and $E_4$ of the two power-transmitting balls 262 and 264 with which this roll 323 contacts and to this roll diameter alined therewith. Similar considerations apply to the shaft 99 of the other rolls.

Each carrier 33 is therefore so disposed between two adjacently disposed balls 26 that the shaft 99 of the roll 32 supported thereby shall intersect the line connecting the centers of these two balls 26, at right angles to this line. As the surfaces of revolution 23 and 24 exert equal pressures upon the power-transmitting balls 26, the two adjacently disposed balls 26 exert equal pressures on opposite sides of the roll 32 disposed between them, with the result that the shafts 99 of the rolls 32 are without load.

In Fig. 14, the power-transmitting ball 262 is shown frictionally engaging the ball race 24 of the cup-shaped half-shell 22 at a contact point $A_2$, and the ball race 23 of the cup-shaped half-shell 21 at a contact point $B_2$. The power-transmitting ball 264 is similarly shown engaging these ball races 24 and 23 at contact points $A_4$ and $B_4$, respectively. Each of the power-transmitting balls 266 and 268 similarly engages frictionally the ball races 24 and 23 at two corresponding contact points, not shown in Fig. 14.

It has already been stated that each power-transmitting ball 26 is engaged at four contact points, two of them provided by the ball-race surfaces 23 and 24, and the other two by the two adjacently disposed rolls 32. The power-transmitting ball 262 of Fig. 14, for example, is engaged by the ball-race surfaces 23 and 24 at $B_2$ and $A_2$, respectively, and by the two adjacently disposed rolls 32 represented by the discs 321 and 323 at $I_2$ and $J_2$. The power-transmitting ball 264, as another example, is similarly engaged by the ball-race surfaces 23 and 24 at $B_4$ and $A_4$, respectively, and by the two adjacently disposed rolls 32 represented by the discs 323 and 325 at $I_4$ and $J_4$.

The contact points $A_2$ and $A_4$ and the corresponding two points of contact, not shown, of the ball race 24 with the power-transmitting balls 266 and 268 are symmetrically disposed in a plane parallel to the plane C at a distance S therefrom, as diagrammatically indicated in Fig. 13. They are obviously disposed symmetrically along the circumference of the circle R determined by the intersection of this plane with the ball race 24. The contact points $B_2$ and $B_4$ and the corresponding two further points of contact, not shown, of the ball race 23 with the power-transmitting balls 266 and 268 are similarly disposed symmetrically along the circumference of the circle T determined by the intersection of the ball race 23 with another plane parallel to the plane C at a distance S therefrom, but on the other side of the plane C. These two planes are perpendicular to the common axis 7 of the alined driving and driven shafts 20 and 19, and they intersect this common axis 7 at points that are represented in Figs. 13 and 14 at G and H, respectively. The points G and H are therefore symmetrically disposed on opposite sides of, and alined with, the central point F of the before-described square, and they are each spaced a distance S from this central point F.

It has before been stated that the cup-shaped half-shell 22, with the ball race 24 carried thereby, is rotated in response to the rotation of the driving shaft 20, and that the ball race 23 is rotated through the power-transmitting balls 26 to rotate the cup-shaped half-shell 21, in order thereby to drive the driven shaft 19. The theory underlying this operation will now be more fully described.

Let it be assumed that the driving shaft 20 is rotated in such a direction as to effect the rotation of the ball race 24 in the direction of the arrows of Fig. 2 or Fig. 14. Since this ball race 24 engages the power-transmitting balls 262 and 264 at the respective contact points $A_2$ and $A_4$ and the power-transmitting balls 266 and 268 at similar points of contact, not shown, there will be a tendency for the power-transmitting balls 262, 264, 266 and 268 to become rotated by the ball race 24. During this rotation of these two power-transmitting balls 262 and 264, the contact points $A_2$ and $A_4$ will tend to travel along directions tangential to the ball race 24. The two power-transmitting balls 262 and 264 tend to become rotated in the directions indicated in Fig. 14 by arrows. The mere fact that these power-transmitting balls 262, 264, 266 and 268 tend to become rotated in response to the rotation of the ball race 24 does not, however, in itself, determine the direction of rotation of these power-transmitting balls 262, 264, 266 and 268.

It has been explained, however, that the power-transmitting ball 262, for example is engaged also by the roll indicated at 321 at the point of contact $I_2$ and by the roll indicated at 323 at the point of contact $J_2$. By reason of the engagement of this power-transmitting ball 262 by the race 24 at the contact point $A_2$, and by the rolls 321 and 323 at the points of contact $I_2$ and $J_2$, however, together with the consequent rotation of the rolls 321 and 323 about their axes $O_1$ and $O_3$, as indicated by the arrows of Fig. 14, the direction of rotation of the ball 262 will be absolutely determined.

In order that this may be understood, it should be observed that, upon the power-transmitting ball 262 commencing to turn, in response to the rotation of the ball race 24, the contact point $A_2$ will start to travel with the power-transmitting ball 262 along the circumference of a circle $K_2$; and the points of contact $I_2$ and $J_2$ will start similarly to travel with the power-transmitting ball along the circumference of a circle $L_2$ the plane of which is parallel to the plane of the circle $K_2$. The power-transmitting ball 262 will therefore obviously rotate about an axis $Q_2$ through the center $E_2$ of the power-transmitting ball 262 and at right angles to the parallel planes of the circles $K_2$ and $L_2$.

By similar reasoning, it may be established that the power-transmitting ball 264 will rotate similarly about an axis $Q_4$ through the center $E_4$ of this power-transmitting ball 264 at right angles to the parallel planes of circles $K_4$ and $L_4$, the loci, respectively, of the contact point $A_4$ and the contact points $I_4$ and $J_4$.

Through similar considerations, it may be established that the power-transmitting balls 266 and 268 will also rotate about axes $Q_6$ and $Q_8$ that, similarly to the axes $Q_2$ and $Q_4$, are disposed perpendicular to the parallel planes of circles corresponding to the circle $K_2$, $L_2$ and $K_4$, $L_4$, respectively. These circles will generally all be small circles of the respective power-transmitting balls 262, 264, 266 and 268.

Owing to the symmetry of the arrangement, and upon the assumption that the axes $O_1$, $O_3$, $O_5$ and $O_7$ of the respective four rolls, three of which are indicated in Fig. 14 at 321, 323 and 325, are adjusted to equal inclinations with the common axis 7 of the driving and driven shafts 20 and 19, the axes $Q_2$, $Q_4$, $Q_6$ and $Q_8$ of rotation of the respective power-transmitting balls 262, 264, 266 and 268 will intersect the common axis 7 at the same point P, as illustrated in Figs. 13 and 14.

The resulting rotation of the power-transmitting balls 262, 264, 266 and 268 about their respective axes $Q_2$, $Q_4$, $Q_6$ and $Q_8$, of course, will be communicated to the ball race 23 of the half-shell 21. The before-mentioned point of contact $B_2$ between the power-transmitting ball 262 and the ball race 23, for example, therefore, travels with the power-transmitting ball 262 along a small circle $M_2$, the plane of which is parallel to the parallel planes of the circles $K_2$ and $L_2$, and perpendicular to the axis $Q_2$ of rotation of the power-transmitting ball 262. During the rotation of the power-transmitting ball 264, similarly, its point of contact $B_4$ with the ball race 23 will similarly travel with the power-transmitting ball 264 along the circumference of a small circle $M_4$, the plane of which is parallel to the parallel planes $K_4$ and $L_4$, and perpendicular to the axis $Q_4$ of rotation of the power transmitting ball 264. Similar considerations apply also to the rotation of the power-transmitting balls 266 and 268 about their respective axes $Q_6$ and $Q_8$.

There will be a tendency, therefore, for the ball race 23 to become rotated in a direction parallel to the direction of rotation of the ball race 24, as indicated by the arrows in Fig. 14, carrying with it the half-shell 21 and, therefore, effecting the rotation of the driven shaft 19.

As the operation of the balls 262, 264, 266 and 268 is identical, it will suffice to describe the further operation by reference to the power-transmitting ball 262 alone.

Since the circles $K_2$, $L_2$ and $M_2$ are of different diameters, the speed of travel of the contact points $A_2$, $I_2$ and $J_2$, and $B_2$ along the circumferences of these respective circles will therefore also be different. Assuming negligible slipping, the ratio of the speeds of travel of the points $A_2$ and $B_2$ along their respective circles $K_2$ and $M_2$ will obviously be the same as the ratio of the speeds of travel of the ball races 24 and 23. The ratio of these speeds of travel, therefore, will be the same as the ratio of the diameters of the circles $K_2$ and $M_2$. If the ball races 23 and 24 should be of different diameters, of course, this ratio would be a function of the rates of their different diameters. Since, moreover, the ratio of the diameters of the circles $K_2$ and $M_2$ is a function of the inclination, to the common axis 7 of the driving and driven shafts 20 and 19, of the axes $Q_2$, $Q_4$, $Q_6$, and $Q_8$ of the respective power-transmitting balls 262, 264, 266 and 268, the ratio of the speeds of travel of the ball races 24 and 23 and, therefore, of the speeds of rotation of the driving shaft 20 and the driven shaft 19, is also a function of the inclination of these axes. It is also a function of the distance 2S. It is similarly a function of the distance between the planes of the circles $K_2$ and $M_2$, which is the same as the distance between the planes of the circles $K_4$ and $M_4$.

In summary, because the rotation of the power-transmitting ball 262 is definitely determined about its axis $Q_2$, by reason of its being firmly engaged at the contact point $A_2$ by the ball race 24 and by the rolls 321 and 323 at the two further contact points $I_2$ and $J_2$, the power-transmitting ball 262 engages the ball race 23 at the fourth point $B_2$ in order definitely to determine the direction of rotation and the relative speed of the ball race 23. The function performed by the power-transmitting balls 264, 266 and 268 is the same as that of the power-transmitting ball 262.

The transmission of the rotary movement between the ball races 23 and 24 and, therefore, the speed ratio between the driving shaft 20 and the driven shaft 19, may therefore be varied, under all conditions of operation, to produce any desired degree of speed reduction or speed increase, by suitably adjusting simultaneously the angles of inclination of the axes $Q_2$, $Q_4$, $Q_6$ and $Q_8$ about which the power-transmitting balls 26 turn. To effect this result, the carriers 33 may be adjusted simultaneously to adjust the rolls 32 simultaneously, each in the plane of the supporting carrier 33 upon which it is carried, in such manner as to maintain the inclinations of the shaft 99 equal. Various mechanisms for effecting this simultaneous adjustment of the rolls 32 will be described presently. The axes $O_1$, $O_3$, $O_5$ and $O_7$ of the shafts 99, moreover, will always intersect the axis 7 at the common point P, which is also the point of intersection of the axes $Q_2$, $Q_4$, $Q_6$ and $Q_8$ of rotation of the power-transmitting balls 26.

According to the preferred embodiment of the invention that is herein illustrated and described, a simpler construction is provided than in the before-mentioned Letters Patent by simultaneously adjusting the rolls 32 through the medium of a mechanism disposed in the region of space 91. This mechanism may be rotatably adjustable about the common axis 7 of the alined shafts 20 and 19; it may be adjustable parallel to this common axis 7, or it may be adjusted in any other suitable way. Because of the simplified construction, moreover, there is less lost motion than in the device of the said Letters Patent.

At least one of the shafts 20 and 19 may be hollow. For illustrative purposes, the driven shaft 19 is shown as hollow. A control element, shown as a rod 36, may extend through the hollow shaft 19 into the region of space 91, where it may be provided with a worm 35. It is the adjustment of the worm 35 that results in simultaneously adjusting the carriers 33. This adjustment of the worm 35 may be effected by rotating the rod 36, as by means of a control wheel 51 that may be pressed on to the outer end of the rod 36.

The rod 36 is journaled on opposite sides of the worm 36 in bushing bearings 37 so as to be rotatable about an axis coincident with the axis 7. Rings 38, pressed or otherwise fixed to the control rod 36, engage the cage members 10 and 11 to prevent longitudinal movement of the control rod 36. By rotating the rod 36, therefore, the worm 35 will be rotated about this axis 7, in the region of space 91. The worm 35 thus constitutes a coupling means disposed in the region of space 91 for adjusting all the supporting carriers 33 simultaneously. The coupling means 35 is operated from this rod 36. It is, of course, wholly immaterial whether the control element 36 extends through the hollow in the driven shaft 19, as shown, or through a hollow, not shown, in the driving shaft 20.

Figure 12:
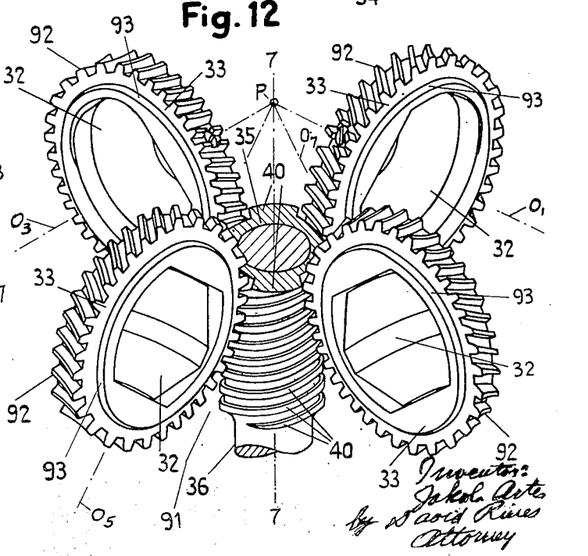
Fig. 12 is a perspective, partly broken away, of a preferred mechanism for simultaneously adjusting the supporting ring carriers, with the rolls supported thereby.

Since the annular gears 92 of the supporting carriers 33 engage different portions of the circumference of the worm 35, it is desirable so to compensate for these differences that the inclinations of the rolls 32 to the common axis 7 of the alined shafts 20 and 19 shall be maintained equal. One method of such compensation is to provide the worm 35 with as many gear-engaging helices 40, or multiples thereof, as there are carriers 33, in order that at least one helix 40 may mesh with the teeth of the annular gear 92 of each carrier 33. According to this method of compensation, the shafts 99 are mounted alike on all the carriers 33. As a result of this simultaneous meshing, the helices 40 will cooperate with the gears 92 of the respective supporting carriers 33, during the rotation of the control rod 36 about its axis, to rotate the carriers 33 simultaneously in their respective planes of rotation.

Figure 4:
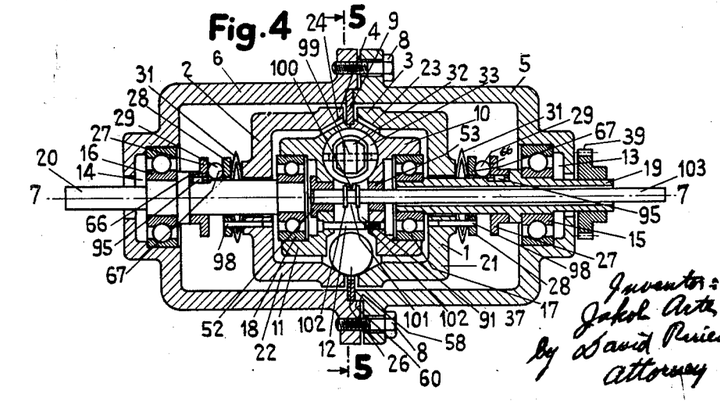
Fig. 4 is a fragmentary section of a modification similar to Fig. 1 taken upon the line 4—4 of Fig. 5, looking in the directions of the arrows.
Figure 5:
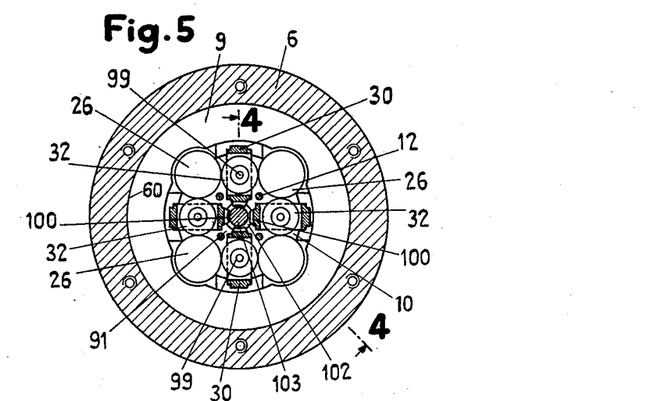
Fig. 5 is a vertical section taken upon the line 5—5 of Fig. 4, looking in the direction of the arrows.

The simultaneous adjustment of the carriers 33 and, therefore, the variation of the speed ratio, has been described above as effected through the rotation of the worm 35. It may, however, be effected in other ways also. As illustrated in Figs. 4 and 5, for example, each of the carriers 33 may be provided with a projection 100 disposed in a recess 101 of a slidably adjustable control member shaft 103. The recess 101 may be provided between two rings 102, fixed to the control member 103 in any desired manner, as by means of a press fit. The control shaft 103 is shown slidably mounted axially in bushings 52 and 53 respectively provided in the parts 11 and 10 of the cage. Longitudinal adjustment of the control shaft 103 therefore results in simultaneous rotary adjustment of the carriers 30, with corresponding simultaneous adjustment of the rolls 32 carried thereby.

Figure 7:
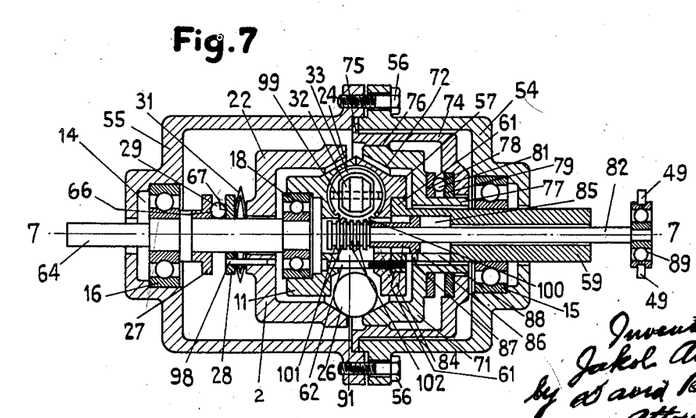
Figs. 7 and 8 are sections similar to Fig. 1 of further modifications.

If desired, the control member 103 may be provided with a plurality of recesses 101 for respectively receiving a plurality of projections 100, as illustrated in Fig. 7. A greater range of slidable adjustment may then be provided for.

The translatory adjustment may be brought about also by other mechanisms, as by means of a cable or a chain (not shown), instead of by the control member 103, acting in opposition to the action of a spring (not shown).

Figure 6:
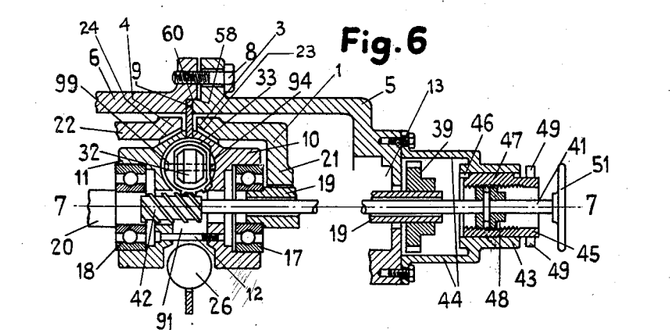
Fig. 6 is a fragmentary section similar to Fig. 1 of another modification.

According to the modification of Fig. 6, the simultaneous adjustment of the carriers 33, and therefore the speed ratio, is varied through the medium of a combined longitudinal movement of the control shaft 41 and its rotation about the axis 7. The outer end of the control shaft 41 is provided with a bushing 48 that is fixed thereto in any desired manner, as by means of a press fit, and the inner end of the control shaft 41 is provided with a worm 42 that meshes with annular gears 92 of the carriers 33. A cylindrical bushing 43 is fastened to the cup-shaped member 5 by supports 44. The bushing 48 is threadedly adjustable in a ring 45 that is slidably mounted in the bushing 43. The ring 45 is prevented from rotating by means of a key 47 integral with the ring 45 in a groove 46 of the bushing 43. To provide a coarse adjustment of the speed ratio, the slidable movement of the ring 45 in the bushing 43 may be effected by means of projections 49, to which a lever, a cable, or some other operating member may be connected. A fine adjustment may be effected through rotation of the shaft 41 and the worm 42 mounted thereon by means of control wheel 51 that may be pressed on to the outer end of the control shaft 41. The worm 42 is shown larger than the worm 35 in order to provide for the coarse longitudinal adjustment parallel to the axis 7 in addition to the fine rotatable adjustment about the axis 7.

The speed ratio may thus be varied over a wide range with accuracy by effecting both a coarse and a fine simultaneous adjustment of the common inclinations of the shafts 99 of the rolls 32.

In all the embodiments of the invention heretofore described, the surfaces of revolution 23 and 24 have all been rotatable. This, however, is by no means essential. As illustrated in Fig. 7, for example, a half-shell 71 provided with a surface of revolution 72 about the axis 7 may be stationary in the cylindrical container constituted of the two cup-shaped members 54 and 55 held together by bolts 56. The cage of Fig. 7, comprising two parts 57, 11, is fixed to the hollow driving shaft 59 so as to rotate therewith in the container 54, 55. The hollow shaft 59 is provided at its inner end with a flange 61 that fits into a recess of the cage member 57. The cage members 57 and 11 and the flange 61 are held together by screws 62.

The driven shaft 64 is journaled in the bearings 16 and 18. The hollow driving shaft 59 is journaled in a bearing 15. The rolls 32 are supported by their carriers 33 in the cage parts 57 and 11 in the same way as described above in connection with Figs. 1 to 3. Cup-shaped half-shells 22 and 71 are yieldingly forced toward each other by pressure units to maintain the balls 26 and the ball races 24 and 72 in engagement in the manner already described. The half-shell 22 is connected through a pressure unit, of the type heretofore described, to the driven shaft 64. The half-shell 71 is connected through a similar pressure unit to a cup-shaped member 74, provided with a ring 75 which is clamped to the stationary container 54, 55. This pressure unit comprises collars 78 and 79 and torque-transmitting pressure balls 81, with or without a spring. If no spring is employed, as illustrated, the necessary tension is provided by the spring 31 of the other pressure unit.

The speed ratio of the drive may be varied by a control shaft 82 axially slidable within the hollow driving shaft 59.

The control shaft 82 is provided with a sleeve 84 having an annular shoulder 86. The shoulder 86 is axially slidable in an undercut cylindrical recess 85 provided in the hollow shaft 59. A pin 87 projecting from the shoulder 86 fits slidably in a slot 88 of the hollow shaft 59, so as to provide for slidable movement of the control shaft 82 and to prevent the rotation of the shaft 82 relative to the hollow shaft 59. The control shaft 82 therefore rotates with the hollow shaft 59 without in any way disturbing the position of the carriers 33. The outer end of the control shaft 82 carries a ball-bearing 89, the outer periphery of which is provided with the projections 49. The control shaft 82 may be axially adjusted to effect the simultaneous adjustment of the carriers 33 in order to control the speed ratio of the drive. This axial adjustment may be brought about by connecting a suitable operating member to the projections 49.

In operation, the hollow driving shaft 59 is connected to a motor or other power source to rotate the cage containing the rolls 32 and the power-transmitting balls 26. Power is thus transmitted from the driving shaft 59 and the cage 57, 11, that is rotatable therewith, to the driven shaft 64 through the conical races 72 and 24 and the power-transmitting balls 26.

When the control shaft 82 is longitudinally adjusted to render the shafts 99 of the rolls 32 approximately parallel to the axis 7, a very large speed reduction will be obtained. The arrangement of Fig. 7 is particularly useful for delivering very small output speeds over long periods of time. This is because, at small output speeds, the locus of the contact points between the power-transmitting balls 26 and the ball races 72 and 24 is constituted of two relatively large circles on the power-transmitting balls 26.

Figure 8:
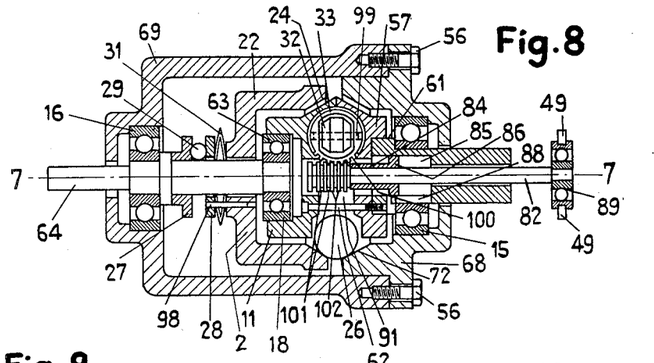

The arrangement of Fig. 7 may be simplified by providing the ball race 72 directly upon the member 68 that constitutes part of the cylindrical container, the other part of which is shown as 69 of Fig. 8. The ball race 72 is thus rendered absolutely rigid with the container 69, 68. By this expedient it becomes possible to eliminate the half-shell 71, the cup-shaped member 74, and the pressure unit 78, 79, 81.

Further modifications which occur to persons skilled in the art and all such are considered to fall within the spirit and scope of the invention, as defined in the appended claims.

What is claimed is:

1. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of freely rotatable rolls disposed about the said region symmetrically with respect to the said common axis, means for maintaining each roll between and rotatably engaging two adjacently disposed balls, and means disposed in the said region for simultaneously adjusting the rolls to vary the transmission of the rotary movement between the ball races.

2. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of freely rotatable rolls disposed about the said region symmetrically with respect to the said common axis rotatable about individual axes inclined to the said common axis, means for maintaining each roll between and rotatably engaging two adjacently disposed balls, and means disposed in the said region for simultaneously adjusting the inclinations of the said individual axes to vary the transmission of the rotary movement between the ball races.

3. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of freely rotatable rolls disposed about the said region symmetrically with respect to the said common axis rotatable about individual axes disposed at a common inclination to the said common axis, means for maintaining each roll between and rotatably engaging two adjacently disposed balls, and means disposed in the said region for simultaneously adjusting the said common inclination of the individual axes to vary the transmission of the rotary movement between the ball races.

4. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of freely rotatable rolls disposed about the said region symmetrically with respect to the said common axis rotatable about individual axes disposed at a common inclination to the said common axis, means for maintaining each roll between and rotatably engaging two adjacently disposed balls, and means rotatably adjustable in the said region about the said common axis for simultaneously adjusting the said common inclination of the individual axes to vary the transmission of the rotary movement between the ball races.

5. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of freely rotatable rolls disposed about the said region symmetrically with respect to the said common axis rotatable about individual axes disposed at a common inclination to the said common axis, means for maintaining each roll between and rotatably engaging two adjacently disposed balls, and means adjustable in the said region parallel to the said common axis for simultaneously adjusting the said common inclination of the individual axes to vary the transmission of the rotary movement between the ball races.

6. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of freely rotatable rolls disposed about the said region symmetrically with respect to the said common axis rotatable about individual axes disposed at a common inclination to the said common axis, means for maintaining each roll between and rotatably engaging two adjacently disposed balls, at least one of the shafts being hollow, and means extending through the hollow shaft into the said region for simultaneously adjusting the said common inclination of the individual axes to vary the transmission of the rotary movement between the ball races.

7. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of supporting members, one between each two adjacently disposed balls, disposed about the said region symmetrically with respect to the said common axis, a roll supported by each supporting member to rotate freely about its axis, means for maintaining each roll between and rotatably engaging the two adjacently disposed balls between which its supporting member is disposed, the supporting members being positioned so that the rolls shall be disposed at a common inclination to the said common axis, and means disposed in the said region for simultaneously adjusting all the supporting members in order simultaneously to adjust the said common inclination of the roll axes, thereby to vary the transmission of the rotary movement between the ball races.

8. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of supporting members, one between each two adjacently disposed balls, disposed about the said region symmetrically with respect to the said common axis, each supporting member being rotatably adjustable in a plane through the said common axis, a roll supported by each supporting member to rotate freely about an axis in the plane of the corresponding supporting member, means for maintaining each roll between and rotatably engaging the two adjacently disposed balls between which its supporting member is disposed, the supporting members being positioned so that the rolls shall be disposed at a common inclination to the said common axis, and means disposed in the said region for adjusting all the supporting members simultaneously in their respective planes in order simultaneously to adjust the said common inclination of the roll axes, thereby to vary the transmission of the rotary movement between the ball races.

9. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of planar supporting members, one between each two adjacently disposed balls, disposed about the said region symmetrically with respect to the said common axis, each supporting member being rotatably adjustable in its plane, a roll supported by each supporting member to rotate freely about an axis in the plane of the corresponding supporting member, means for maintaining each roll between and rotatably engaging the two adjacently disposed balls between which its supporting member is disposed, the supporting members being positioned so that the rolls shall be disposed at a common inclination to the said common axis, at least one of the shafts being hollow, and means extending through the hollow shaft into the said region for adjusting the supporting members simultaneously in their respective planes in order simultaneously to adjust the said common inclination of the roll axes, thereby to vary the transmission of the rotary movement between the ball races.

10. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of gears, one between each two adjacently disposed balls, disposed about the said region symmetrically with respect to the said common axis, a roll supported by each gear to rotate about its axis, means for maintaining each roll between and rotatably engaging the two adjacently disposed balls between which its supporting gear is disposed, the gears being positioned so that the rolls shall be disposed at a common inclination to the said common axis, and means meshing with all the gears for simultaneously adjusting the gears in order simultaneously to adjust the said common inclination of the roll axes, thereby to vary the transmission of the rotary movement between the ball races.

11. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of gears coplanar with the said common axis, one between each two adjacently disposed balls, disposed about the said region symmetrically with respect to the said common axis, a roll supported by each gear to rotate about an axis in the plane of the corresponding supporting gear, means for maintaining each roll between and rotatably engaging the two adjacently disposed balls between which its supporting gear is disposed, the gears being positioned so that the rolls shall be disposed at a common inclination to the said common axis, and means meshing with all the gears for simultaneously adjusting the gears in their respective planes in order simultaneously to adjust the said common inclination of the roll axes, thereby to vary the transmission of the rotary movement between the ball races.

12. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of gears coplanar with the said common axis, one between each two adjacently disposed balls, disposed about the said region symmetrically with respect to the said common axis, a roll supported by each gear to rotate about an axis in the plane of the corresponding supporting gear, means for maintaining each roll between and rotatably engaging the two adjacently disposed balls between which its supporting gear is disposed, the gears being positioned so that the rolls shall be disposed at a common inclination to the said common axis, at least one of the shafts being hollow, and means extending through the hollow shaft and provided with means in the said region for meshing with all the gears in order simultaneously to adjust the gears in their respective planes, thereby, by simultaneously adjusting the said common inclination of the roll axes, to vary the transmission of the rotary movement between the ball races.

13. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of gears, one between each two adjacently disposed balls, disposed about the said region symmetrically with respect to the said common axis, a roll supported by each gear to rotate about its axis, means for maintaining each roll between and rotatably engaging the two adjacently disposed balls between which its supporting gear is disposed, the gears being positioned so that the rolls shall be disposed at a common inclination to the said common axis, and a member rotatable about the said common axis in the said region provided with as many gear-engaging helices or multiples thereof as there are gears and respectively cooperating with the respective gears to rotate the gears simultaneously in response to the rotation of the said rotatable member in order, by adjusting the gears simultaneously, to adjust the said common inclination of the roll axes simultaneously, thereby to vary the transmission of the rotary movement between the ball races.

14. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of rolls disposed about the said region symmetrically with respect to the said common axis rotatable about individual axes disposed at a common inclination to the said common axis, means for maintaining each roll between and rotatably engaging two adjacently disposed balls, and means for simultaneously adjusting the said common inclination of the individual axes, the simultaneous adjusting means being operable to effect a coarse simultaneous adjustment and also to effect a fine simultaneous adjustment of the said common inclination of the individual axes, thereby to effect a correspondingly coarse and a correspondingly fine variation of the transmission of the rotary movement between the ball races.

15. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of rolls disposed about the said region symmetrically with respect to the said common axis rotatable about individual axes disposed at a common inclination to the said common axis, means for maintaining each roll between and rotatably engaging two adjacently disposed balls, and means disposed in the said region for simultaneously adjusting the said common inclination of the individual axes, the simultaneous adjusting means being operable to effect a coarse simultaneous adjustment and also to effect a fine simultaneous adjustment of the said common inclination of the individual axes, thereby to effect a correspondingly coarse and a correspondingly fine variation of the transmission of the rotary movement between the ball races.

16. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of supporting members, one between each two adjacently disposed balls, disposed about the said region symmetrically with respect to the said common axis, a roll supported by each supporting member to rotate about its axis, means for maintaining each roll between and rotatably engaging the two adjacently disposed balls between which its supporting member is disposed, the supporting members being positioned so that the rolls shall be disposed at a common inclination to the said common axis, and means for adjusting all the supporting members in order simultaneously to adjust the said common inclination of the roll axes, the simultaneous adjusting means being movable parallel to the said common axis to effect a coarse simultaneous adjustment and being also rotatable about the said common axis to effect a fine simultaneous adjustment of the said common inclination of the roll axes, thereby to effect a correspondingly coarse and a correspondingly fine variation of the transmission of the rotary movement between the ball races.

17. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of supporting members, one between each two adjacently disposed balls, disposed about the said region symmetrically with respect to the said common axis, a roll supported by each supporting member to rotate about its axis, means for maintaining each roll between and rotatably engaging the two adjacently disposed balls between which its supporting member is disposed, the supporting members being positioned so that the rolls shall be disposed at a common inclination to the said common axis, and means disposed in the said region for adjustably engaging all the supporting members in order simultaneously to adjust the said common inclination of the roll axes, the simultaneous adjusting means being simultaneously movable parallel to and rotatable about the said common axis to effect simultaneously a coarse and a fine simultaneous adjustment of the common inclination of the roll axes, thereby to effect a corresponding simultaneous coarse and fine variation of the transmission of the rotary movement between the ball races.

18. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of gears, one between each two adjacently disposed balls, disposed about the said region symmetrically with respect to the said common axis, a roll supported by each gear to rotate about its axis, means for maintaining each roll between and rotatably engaging the two adjacently disposed balls between which its supporting gear is disposed, the gears being positioned so that the rolls shall be disposed at a common inclination to the said common axis, and means meshing with all the gears for simultaneously adjusting the gears in order simultaneously to adjust the said common inclination of the roll axes, the meshing means being simultaneously movable parallel to and rotatable about the said common axis to effect simultaneously a coarse and a fine simultaneous adjustment of the common inclination of the roll axes, thereby to effect a corresponding simultaneous coarse and fine variation of the transmission of the rotary movement between the ball races.

19. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of gears coplanar with the said common axis, one between each two adjacently disposed balls, disposed about the said region symmetrically with respect to the said common axis, a roll supported by each gear to rotate about an axis in the plane of the corresponding supporting gear, means for maintaining each roll between and rotatably engaging the two adjacently disposed balls between which its supporting gear is disposed, the gears being positioned so that the rolls shall be disposed at a common inclination to the said common axis, and a member disposed in the said region provided with as many gear-engaging helices or multiples thereof as there are gears and respectively cooperating with the respective gears to rotate the gears simultaneously to adjust the gears simultaneously in their respective planes in order simultaneously to adjust the said common inclination of the roll axes, the member being simultaneously movable parallel to and rotatable about the said common axis to effect simultaneously a coarse and a fine simultaneous adjustment of the common inclination of the roll axes, thereby to effect a corresponding simultaneous coarse and fine variation of the transmission of the rotary movement between the ball races.

20. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, one of the members being rotatable with one of the shafts, means whereby rotation of either shaft is transmitted through the ball races and the balls to the other shaft, a plurality of gears coplanar with the said common axis, one between each two adjacently disposed balls, disposed about the said region symmetrically with respect to the said common axis, a roll supported by each gear to rotate about an axis in the plane of the corresponding supporting gear, means for maintaining each roll between and rotatably engaging the two adjacently disposed balls between which its supporting gear is disposed, the gears being positioned so that the rolls shall be disposed at a common inclination to the said common axis, at least one of the shafts being hollow, and a member extending through the hollow shaft into the said region provided with as many gear-engaging helices or multiples thereof as there are gears and respectively cooperating with the respective gears to rotate the gears simultaneously to adjust the gears simultaneously in their respective planes in order simultaneously to adjust the said common inclination of the roll axes, the member being simultaneously movable parallel to and rotatable about the said common axis to effect simultaneously a coarse and a fine simultaneous adjustment of the common inclination of the roll axes, thereby to effect a corresponding simultaneous coarse and fine variation of the transmission of the rotary movement between the ball races.

21. Apparatus for transmitting motion from a driving shaft to a driven shaft provided with a common axis having, in combination, two cup-shaped members disposed with the open ends of the cups adjacent to each other, a cage disposed in the cup-shaped members, a plurality of balls supported by the cage symmetrically with respect to the said common axis, the said open ends of the cups being inclined toward each other away from the said common axis to form ball races for engaging the balls in order to effect rotation of the balls, thereby to transmit relative rotary movement between the cup-shaped members, means yieldingly forcing the cup-shaped members toward each other to maintain the balls and the ball races in engagement, one of the cup-shaped members being rotatable with one of the shafts, means whereby rotation of either shaft is transmitted through the ball races and the balls to the other shaft, a plurality of rolls rotatable about their individual axes supported by the cage symmetrically with respect to the said common axis with their individual axes disposed at a common inclination to the said common axis, means for maintaining each roll between and rotatably engaging two adjacently disposed balls, and means disposed in the cage for simultaneously adjusting the said common inclination of the rolls.

22. Apparatus for transmitting motion from a driving shaft to a driven shaft provided with a common axis in a region of space having, in combination, a plurality of balls disposed about the said region symmetrically with respect to the said common axis, members rotatable with the respective shafts respectively provided with surfaces of revolution about the said common axis to form ball races for engaging the balls, means for maintaining the balls and the ball races in engagement, a plurality of rolls disposed about the said region symmetrically with respect to the said common axis, means for maintaining each roll between and rotatably engaging two adjacently disposed balls, and means disposed in the said region for simultaneously adjusting the rolls to vary the transmission of the rotary movement between the ball races.

23. Apparatus for transmitting motion from a driving shaft to a driven shaft provided with a common axis having, in combination, a cup-shaped member rotatable with each shaft with the open ends of the cups disposed adjacent to each other, a cage disposed in the cup-shaped members, a plurality of balls supported by the cage symmetrically with respect to the said common axis, the said open ends of the cups being inclined toward each other away from the said common axis to form ball races for engaging the balls in order to effect rotation of the balls, thereby to transmit rotary movement between the cup-shaped members, means yieldingly forcing the cup-shaped members toward each other to maintain the balls and the ball races in engagement, a plurality of rolls rotatable about their individual axes supported by the cage symmetrically with respect to the said common axis with their individual axes disposed at a common inclination to the said common axis, means for maintaining each roll between and rotatably engaging two adjacently disposed balls, and means disposed in the cage for simultaneously adjusting the said common inclination of the rolls.

24. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, one of the members being rotatable with one of the shafts, the other member being stationary, means whereby rotation of either shaft is transmitted through the ball races and the balls to the other shaft, a plurality of rolls disposed about the said region symmetrically with respect to the said common axis, means for maintaining each roll between and rotatably engaging two adjacently disposed balls, and means disposed in the said region for simultaneously adjusting the rolls to vary the transmission of the rotary movement between the ball races.

25. Apparatus for transmitting motion from a driving shaft to a driven shaft provided with a common axis in a region of space having, in combination, a plurality of balls disposed about the said region symmetrically with respect to the said common axis, transmitting means comprising two members respectively provided with surfaces of revolution about the said common axis to form ball races for engaging the balls, a plurality of freely rotatable rolls disposed about the said region symmetrically with respect to the said common axis, and means for maintaining each roll between and rotatably engaging two adjacently disposed balls, the said transmitting means having means for transforming the rotation of the driving shaft into a rolling movement of the balls on the ball races in order to transmit the rotation of one of the two members about the common axis, produced by said rolling movement, to the driven shaft, and further means disposed in the said region for simultaneously adjusting the rolls to vary the transmission of the rotary movement between the ball races.

26. Apparatus for transmitting motion from a driving shaft to a driven shaft provided with a common axis in a region of space having, in combination, a plurality of balls disposed about the said region symmetrically with respect to the said common axis, members rotatable with the respective shafts respectively provided with surfaces of revolution about the said common axis to form ball races for engaging the balls, means for maintaining the balls and the ball races in engagement, a plurality of supporting members, one between each two adjacently disposed balls, disposed about the said region symmetrically with respect to the said common axis, a roll supported by each supporting member to rotate freely about its axis, means for maintaining each roll between and rotatably engaging the two adjacently disposed balls between which its supporting member is disposed, the supporting members being positioned so that the rolls shall be disposed at a common inclination to the said common axis, coupling means disposed in the said region for simultaneously adjusting all the supporting members in order simultaneously to adjust the said common inclination of the roll axes, thereby to vary the transmission of the rotary movement between the ball races, and means for operating the coupling means.

27. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, a pressure unit, means connecting one of the members through the pressure unit with one of the shafts to rotate the said member with the said one shaft, means whereby rotation of either shaft is transmitted through the ball races and the balls to the other shaft, a plurality of rolls disposed about the said region symmetrically with respect to the said common axis, means for maintaining each roll between and rotatably engaging two adjacently disposed balls, and means disposed in the said space for simultaneously adjusting the rolls to vary the transmission of the rotary movement between the ball races.

28. Apparatus for transmitting motion from a driving shaft to a driven shaft provided with a common axis in a region of space having, in combination, a plurality of balls disposed about the said region symmetrically with respect to the said common axis, two members respectively provided with surfaces of revolution about the said common axis to form ball races for engaging the balls, means for maintaining the balls and the ball races in engagement, a pressure unit comprising two collars, pressure balls disposing between the collars and a spring, one of the collars being fixed to one of the shafts, the other collar being rotatable with but slidable with respect to one of the members, the spring exerting tension between the said other collar and the said one member, whereby the said one member is rendered rotatable with one of the shafts through the pressure unit, means whereby rotation of either shaft is transmitted through the ball races and the balls to the other shaft, a plurality of rolls disposed about the said region symmetrically with respect to the said common axis rotatable about individual axes inclined to the said common axis, means for maintaining each roll between and rotatably engaging two adjacently disposed balls, and means disposed in the said region for simultaneously adjusting the inclinations of the said individual axes to vary the transmission of the rotary movement between the ball races.

29. Apparatus for transmitting motion from a driving shaft to a driven shaft provided with a common axis in a region of space having in combination, a container, a cage in the container comprising a plurality of balls disposed about the said region symmetrically with respect to the said common axis, two members in the container respectively provided with surfaces of revolution about the said common axis to form ball races for engaging the balls, one of the ball races being substantially fixed relative to the container, means for maintaining the balls and the ball races in engagement, one of the members being rotatable with one of the shafts, the cage being rotatable with the other shaft, means whereby rotation of either shaft is transmitted through the ball races and the balls to the other shaft, a plurality of rolls disposed about the said region symmetrically with respect to the said common axis rotatable about individual axes disposed at a common inclination to the said common axis, means for maintaining each roll between and rotatably engaging two adjacently disposed balls, and means disposed in the said region for simultaneously adjusting the said common inclination of the individual axes to vary the transmission of the rotary movement between the ball races.

30. Apparatus for transmitting motion from a driving shaft to a driven shaft provided with a common axis in a region of space, having, in combination, a container, a cage in the container comprising a plurality of balls disposed about the said region symmetrically with respect to the said common axis, two members in the container respectively provided with surfaces of revolution about the said common axis to form ball races for engaging the balls, one of the ball races being rigid with the container, means for maintaining the balls and the ball races in engagement, one of the members being rotatable with one of the shafts, the cage being rotatable with the other shaft, means whereby rotation of either shaft is transmitted through the ball races and the balls to the other shaft, a plurality of rolls disposed about the said region symmetrically with respect to the said common axis rotatable about individual axes disposed at a common inclination to the said common axis, means for maintaining each roll between and rotatably engaging two adjacently disposed balls, and means rotatably adjustable in the said region about the said common axis for simultaneously adjusting the said common inclination of the individual axes to vary the transmission of the rotary movement between the ball races.

JAKOB ARTER.

REFERENCES CITED

The following references are of record in the file of this patent:

UNITED STATES PATENTS

| Number | Name | Date |
|---|---|---|
| 312,171 | Shaw | Feb. 10, 1888 |
| 717,225 | Lewis | Dec. 20, 1902 |
| 1,063,244 | Dietrich | June 3, 1913 |
| 1,718,846 | Arter | June 25, 1929 |
| 2,163,066 | Searcy | June 20, 1939 |

FOREIGN PATENTS

| Number | Country | Date |
|---|---|---|
| 216,762 | Switzerland | Sept. 15, 1941 |